(12) United States Patent
Hiyoshi et al.

(10) Patent No.: US 10,287,975 B2
(45) Date of Patent: May 14, 2019

(54) INTERNAL COMBUSTION ENGINE

(71) Applicant: NISSAN MOTOR CO., LTD., Yokohama-shi, Kanagawa (JP)

(72) Inventors: Ryousuke Hiyoshi, Kanagawa (JP); Yoshiaki Tanaka, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/745,805

(22) PCT Filed: Jul. 21, 2015

(86) PCT No.: PCT/JP2015/070653
§ 371 (c)(1),
(2) Date: Jan. 18, 2018

(87) PCT Pub. No.: WO2017/013727
PCT Pub. Date: Jan. 26, 2017

(65) Prior Publication Data
US 2018/0202355 A1    Jul. 19, 2018

(51) Int. Cl.
*F02B 75/32* (2006.01)
*F02B 75/04* (2006.01)
*F02D 15/02* (2006.01)
*F16C 7/02* (2006.01)

(52) U.S. Cl.
CPC .............. *F02B 75/32* (2013.01); *F02B 75/04* (2013.01); *F02B 75/044* (2013.01); *F02B 75/047* (2013.01); *F02D 15/02* (2013.01); *F16C 7/023* (2013.01); *F16C 2360/22* (2013.01)

(58) Field of Classification Search
CPC ...... F02B 75/32; F02B 75/044; F02B 75/047; F02D 15/02; F16C 7/023; F16C 2360/22
See application file for complete search history.

(56) References Cited

U.S. PATENT DOCUMENTS

2013/0306035 A1\* 11/2013 Hiyoshi ............... F02B 75/047
123/48 B

FOREIGN PATENT DOCUMENTS

| JP | 2000-073804 A | 3/2000 |
| JP | 2013-241846 A | 12/2013 |

\* cited by examiner

*Primary Examiner* — Hung Q Nguyen
*Assistant Examiner* — Xiao En Mo
(74) *Attorney, Agent, or Firm* — Foley & Lardner LLP

(57) ABSTRACT

An internal combustion engine includes: a variable compression ratio mechanism arranged to vary an engine compression ratio in accordance with a rotation position of a control shaft; an actuator arranged to vary the rotation position of the control shaft; an arm portion extending from the control shaft in a radially outward direction; a lever arranged to link the actuator and the arm portion; a link pin which penetrates the lever and the arm portion, and which rotatably links the lever and the arm portion; and a wall portion which confronts an end surface of the link pin irrespective of the rotation position of the control shaft, and which retains the link pin to the lever or the arm portion.

4 Claims, 8 Drawing Sheets

INTERNAL COMBUSTION ENGINE

TECHNICAL FIELD

This invention relates to an internal combustion engine including a variable compression ratio mechanism arranged to vary an engine compression ratio.

BACKGROUND ART

Conventionally, there is known a variable compression ratio mechanism arranged to vary an engine compression ratio of an internal combustion engine by using a multi-link piston crank mechanism.

For example, a patent document 1 discloses a variable compression ratio mechanism including a control shaft arranged to vary an engine compression ratio of an internal combustion engine in accordance with a rotation position; an arm portion extending from the control shaft in a radial direction; a lever rotatably linked through a link pin to the arm portion, and arranged to be reciprocated in the radial direction of the control shaft; an actuator arranged to drive the lever; and journal portions of the control shaft which are provided on both sides of the arm portion in an axial direction.

In this patent document 1, a thrust surface confronting an axial end surface of the link pin is provided to the control shaft, or a bearing member rotatably supporting the journal portions. The link pin is retained by this thrust surface.

However, a position of the link pin is varied by a rotation of the control shaft when the engine compression ratio is varied. Accordingly, it is necessary that the thrust surface is formed to the bearing member and the control shaft so that the thrust surface confronts the end surface of the link pin even when the engine compression ratio is varied.

PRIOR ART DOCUMENT

Patent Document

Japanese Patent Application Publication No. 2013-241846

SUMMARY OF THE INVENTION

An internal combustion engine according to the present invention comprises: a variable compression ratio mechanism arranged to vary an engine compression ratio in accordance with a rotation position of a control shaft; an actuator arranged to vary the rotation position of the control shaft; an arm portion extending from the control shaft in a radially outward direction; a lever arranged to link the actuator and the arm portion; a link pin which penetrates the lever and the arm portion, and which rotatably links the lever and the arm portion; and a wall portion which confronts an end surface of the link pin irrespective of the rotation position of the control shaft, and which retains the link pin to the lever or the arm portion. Mounting positions of a stopper including the wall portion to an internal combustion engine main body are set on both sides of the link pin in an axial direction of the link pin.

By the present invention, it is possible to surely prevent the link pin from falling off (coming off) in the axial direction of the link pin, irrespective of the rotation position of the control shaft, that is, irrespective of the position of the link pin.

DESCRIPTION OF EMBODIMENTS

Hereinafter, a first embodiment according to the present invention is explained in detail with reference to the drawings.

Figure 1:
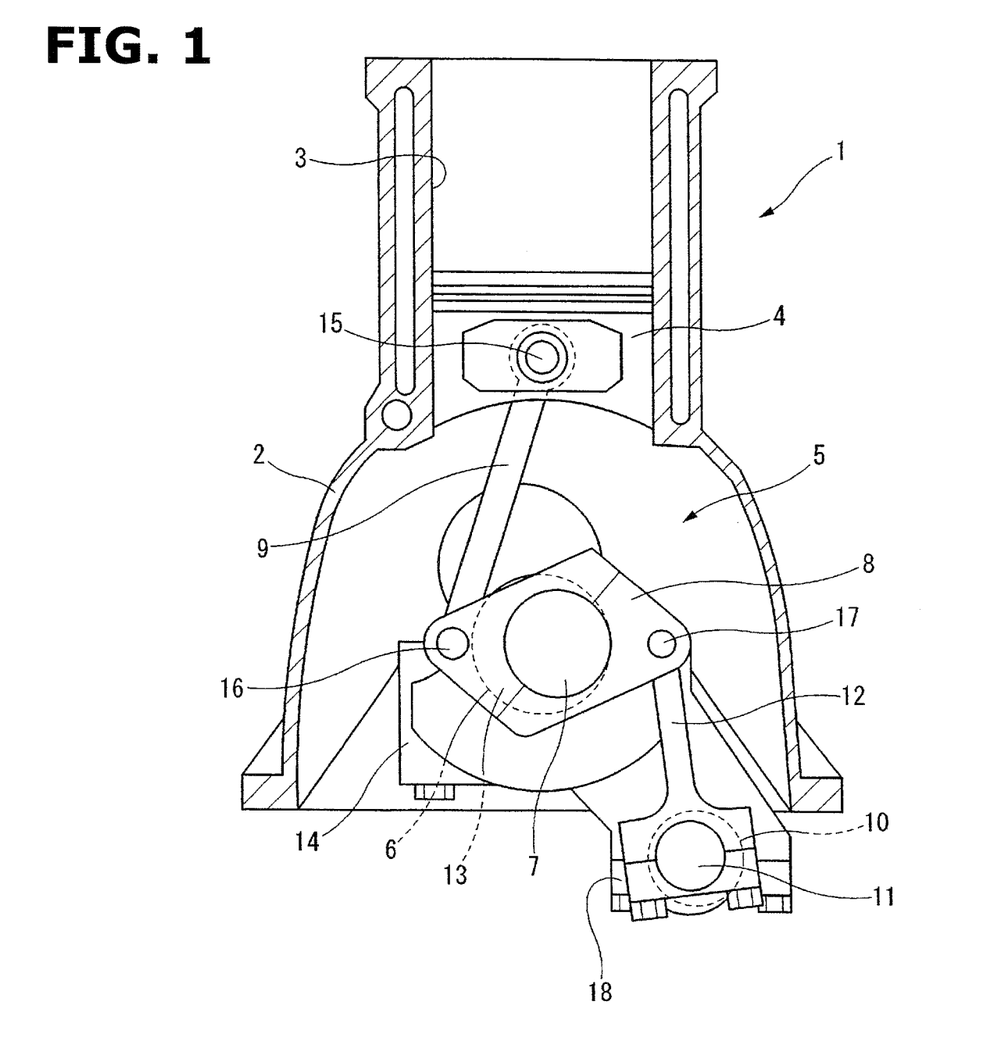
FIG. 1 is an explanation view schematically showing a variable compression ratio mechanism which is applied to an internal combustion engine according to the present invention.

As shown in FIG. 1, an internal combustion engine 1 includes a variable compression ratio mechanism 5 arranged to vary an upper dead center position of a piston 4 arranged to be reciprocated within a cylinder 3 of a cylinder block 2 constituting an engine main body, and thereby to vary an engine compression ratio.

The variable compression ratio mechanism 5 uses a multi-link type piston crank mechanism in which the piston 4 and a crank pin 7 of a crank shaft 6 are linked by a plurality of links. The variable compression ratio mechanism 5 includes a lower link 8 rotatably mounted to the crank pin 7; an upper link 9 linking this lower link 8 and the piston 4; a control shaft 10 including an eccentric shaft portion 11; and a control link 12 linking the eccentric shaft portion 11 and the lower link 8.

The crank shaft 6 includes a plurality of journal portions 13 and the crank pin 7. The journal portions 13 are rotatably supported between the cylinder block 2 and a crank bearing bracket 14.

The upper link 9 includes one end rotatably mounted to a piston pin 15, and the other end rotatably linked to the lower link 8 by a first link pin 16. The control link 12 includes one end rotatably linked to the lower link 8 by a second link pin 17; and the other end rotatably mounted to the eccentric shaft portion 11 of the control shaft 10.

In this case, the first link pin 16 and the second link pin 17 are fixed, for example, to the lower link 8 by the press fit.

The control shaft 10 is disposed parallel to the crank shaft 6. The control shaft 10 is rotatably supported by the cylinder block 2. Specifically, the control shaft 10 is qtr rotatably supported between the crank bearing bracket 14 and a control shaft bearing bracket 18.

The control shaft 10 is arranged to be driven and rotated by an electric motor 21 (cf. FIG. 2) which is an actuator.

Figure 2:
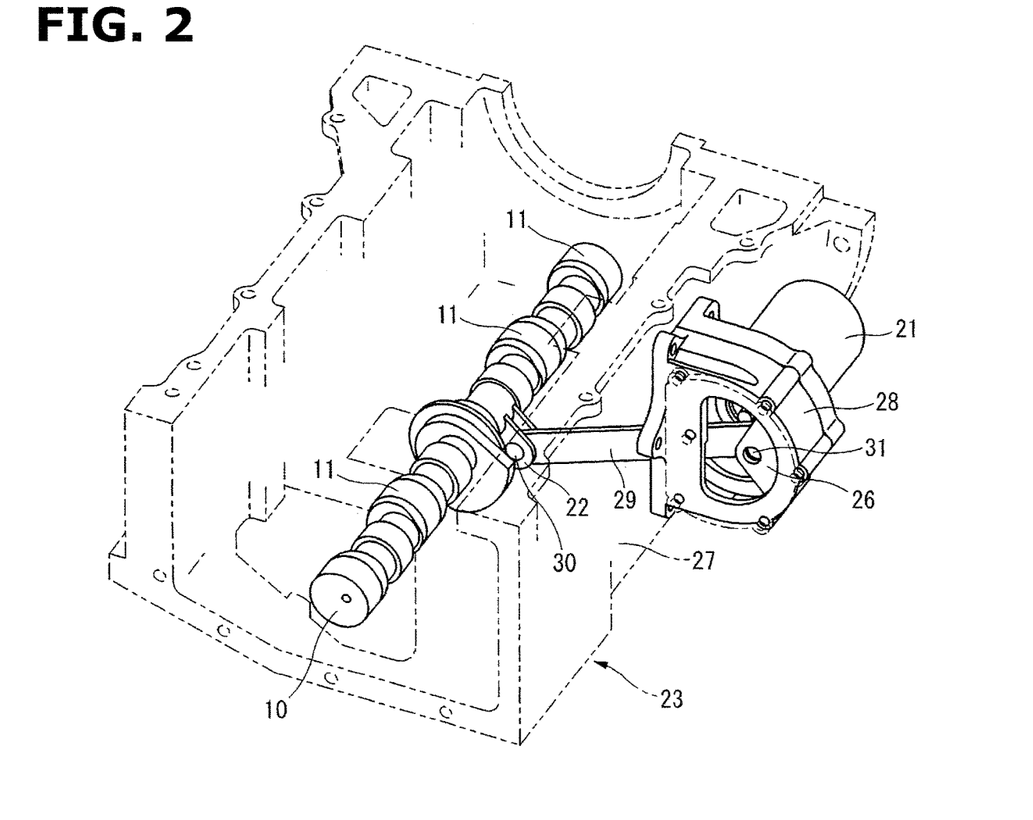
FIG. 2 is an explanation view schematically showing a link mechanism between an electric motor and a control icy shaft of the variable compression ratio mechanism.

The electric motor 21 varies a rotation position of the control shaft 10, so that a position of the eccentric shaft portion 11 which is a swinging fulcrum of the control link 12. With this, a posture of the lower link 8 is varied, so that a piston motion (stroke) of the piston 4, that is, an upper dead center position and a lower dead center position of the piston 4 are varied to continuously vary the engine compression ratio. Besides, a driving source of the control shaft 10 is not limited to the electric motor 21. The driving source of the control shaft 10 may be a hydraulically driven actuator.

FIG. 2 is an explanation view schematically showing a link mechanism between the control shaft 10 and the electric motor 21.

The control shaft 10 includes a control shaft arm portion 22 which is an arm portion that has a bifurcated shape, and that extending in a radially outward direction. The control shaft 10 is rotatably supported within the internal combustion engine main body constituted by the cylinder block 2, the upper oil pan 23 fixed on a lower side (lower portion) of the cylinder block 2, and so on.

The electric motor 21 is disposed outside the internal combustion engine main body. A speed of rotation of the electric motor 21 is reduced by a speed reduction device (not shown). The speed-reduced rotation is picked up as a rotation of a speed reduction device output shaft (not shown).

The speed reduction device output shaft includes an output shaft arm portion 26 extending in the radially outward direction. The speed reduction device, the speed reduction device output shaft, and the output shaft arm portion 26 are disposed outside the internal combustion engine main body. The speed reduction device, the speed reduction device output shaft, and the output shaft arm portion 26 are received within a housing 28 mounted to an upper oil pan side wall 27 which is a side wall of the internal combustion engine main body. In this embodiment, the electric motor 21 is mounted to a rear end of this housing 28.

The speed reduction device output shaft extends in forward and rearward directions of the engine along the upper oil pan side wall 27. The control shaft arm portion 22 and the output shaft arm portion 26 are linked with each other by an elongated lever 29 which is perpendicular to the control shaft 10 and the speed reduction device output shaft. That is, the control shaft 10 disposed within the internal combustion engine main body in which the lubricant oil is dispersed, and the speed reduction device output shaft provided outside the internal combustion engine main body are mechanically linked with each other by the lever 29 penetrating through the upper oil pan side wall 27.

One end of the lever 29 is sandwiched between tip ends of the control shaft arm portion 22. The control arm portion 22 and the lever 29 are rotatably linked with each other through a control shaft side link pin 30 which has a cylindrical shape. The control shaft side link pin 30 corresponds to a link pin. The control shaft side link pin 30 penetrates through the tip ends of the control shaft arm portion 22 and the one end of the lever 29 in parallel with the control shaft 10.

The other end of the lever 29 is rotatably linked through the output shaft side link pin 31 with the tip ends of the output shaft arm portion 26. When the speed reduction device output shaft is rotated in accordance with the rotation of the electric motor 21, the lever 29 is reciprocated along a plane perpendicular to the control shaft 10. Then, the control shaft arm portion 22 is swung in accordance with the reciprocating movement of the lever 29, so that the control shaft 10 is rotated.

In this case, the stopper 32 restricts the position of the control shaft side link pin 30 along an axial direction of the control shaft side link pin (the control shaft axial direction), so that the control shaft side link pin 30 is not be fallen off from the tip ends of the control shaft arm portion 22 and the one end of the lever 29.

In the first embodiment, as shown in FIG. 3 to FIG. 6, the stopper 32 includes one end-side side wall 33 which is a wall portion confronting one end surface of the control shaft side link pin 30; the other end-side side wall 34 which is a wall portion that is parallel to the one end-side side wall 33, and that confronts the other end surface of the control shaft side link pin 30; a bottom wall 35 connecting the one end-side side wall 33 and the other end-side side wall 34; one end side flange 36 which has a plate shape, which protrudes from the one end-side side wall 33, and which is fixed to a portion of the upper oil pan 23 that has a relatively high rigidity; and the other end side flange 37 which has a plate shape, which protrudes from the other end-side side wall 34, and which is fixed to a portion of the upper oil pan 23 that has a relatively high rigidity.

Figure 3:
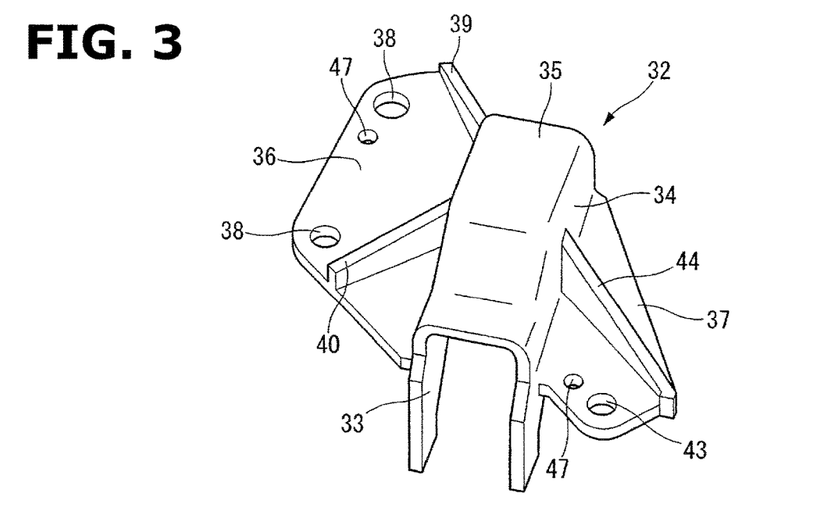
FIG. 3 is a perspective view showing a stopper in a first embodiment.

The tip ends of the control shaft arm portion 22 and the one end of the lever 29 are disposed between the one end-side side wall 33 and the other end-side side wall 34 of the stopper 32.

The one end-side side wall 33 includes an upper side portion formed into a curved shape along a movement locus (trajectory) of a large end portion of the control link 12 which is mounted to the eccentric shaft portion 11, when viewed in the axial direction of the control shaft side link pin (the control shaft axis direction), and formed to constantly partially confront the one end surface of the control shaft side link pin 30, irrespective of the engine compression ratio, that is, irrespective of the rotation position of the control shaft 10. That is, the tip end of the one end-side side wall 33 is formed to be constantly partially overlapped with the one end surface of the control shaft side link pin 30 when viewed from the axial direction of the control shaft side link pin, even when the control shaft 10 is rotated between a state (FIG. 5) where the control shaft 10 is abutted on a high compression ratio side (not shown), and a state (FIG. 6) where the control shaft 10 is abutted on a low compression ratio side stopper (not shown).

The other end-side side wall 34 is formed so as not to be interfered with components around the other end-side side wall 34. The other end-side side wall 34 is formed so as to constantly partially confront the other end surface of the control shaft side link pin 30, irrespective of the engine compression ratio, that is, irrespective of the rotation position of the control shaft 10. That is, the other end-side side wall 34 is formed so that the tip end of the other end-side side wall 34 is constantly partially overlapped with the other end surface of the control shaft side link pin 30 when viewed in the axial direction of the control shaft side link pin, even when the control shaft 10 is rotated between the state (FIG. 5) where the control shaft 10 is abutted on the high compression ratio side stopper (not shown), and the state (FIG. 6) where the control shaft 10 is abutted on the low compression ratio side stopper (not shown).

Besides, in this embodiment, the other end-side side wall 34 is formed to be higher than the one end-side side wall 33. With this, the area of the other end-side side wall 34 which is overlapped with the control shaft side link pin 30 is relatively large. However, the heights of the other end-side side wall 34 and the one end-side side wall 33 may be arbitrary values as long as these are not interfered with the components around these. The one end-side side wall 33 may be formed to be higher than the other end-side side wall 34 in a case where these are not interfered with the components around these.

Figure 4:
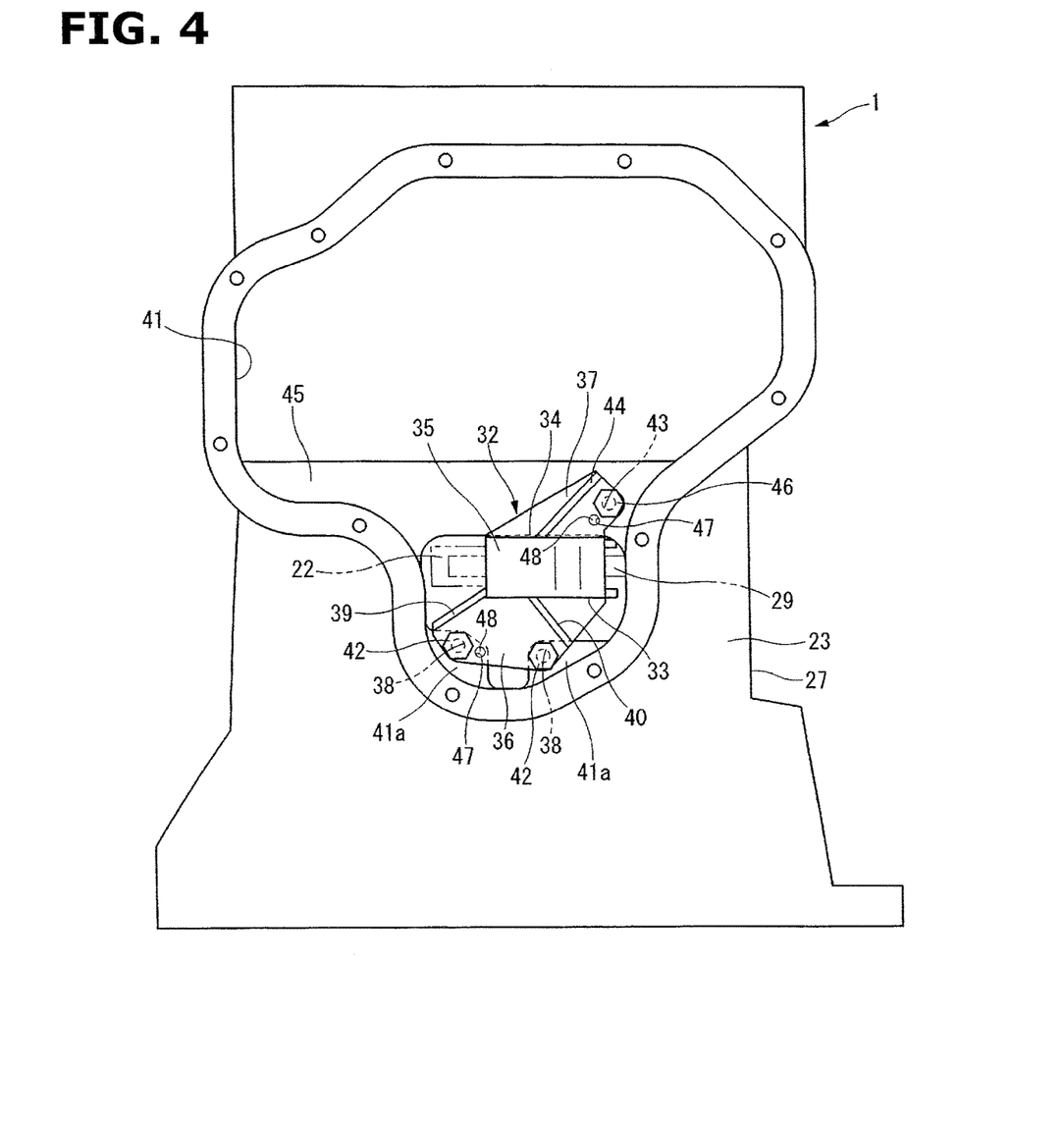
FIG. 4 is an explanation view schematically showing a mounting state in which the stopper is mounted to an upper oil pan in the first embodiment.

The one end side flange 36 includes two one end side bolt through holes 38 and 38, and two one end side ribs 39 and 40. The one end side bolt through holes 38 and 38 are positioned on a tip end side of the one end side flange 36. The two one end bolt through holes 38 and 38 are apart from each other in a longitudinal direction of the stopper 32. The one end side flange 36 is fixed to a flange 41a which is located on an inner circumference side of an opening edge of the opening portion 41 that is formed on the upper oil pan 23, from the low surface side of the upper oil pan 23 by two bolts 42 and 42 along the radial direction of the control shaft (the radial direction of the control shaft link pin).

The opening portion 41 of the upper oil pan 23 includes one end side (a lower portion in FIG. 4) of the cylinder direction (upward and downward directions in FIG. 4) which has a relatively small width. The flange 41a is positioned on the opening edge of the one end of the opening portion 41 in the cylinder direction. That is, the flange 41a has a rigidity relatively higher in the opening edge of the opening portion 41 of the upper oil pan 23.

Besides, a lower oil pan (not shown) is mounted to the opening portion 41 of the upper oil pan 23.

The other end side flange 37 includes the other end side bolt through hole 43, and the other end side rib 44. The other end side through hole 43 is positioned on a tip end side of the other end side flange 37. The other end side flange 37 is fixed at a portion of a beam portion 45 which has a relatively high rigidity, from the lower surface side of the upper oil pan 23 by a bolt 46 along the radial direction of the control shaft. The beam portion crosses the opening portion 41 of the upper oil pan 23 in the widthwise direction (the leftward and rightward directions in FIG. 4) of the internal combustion engine main body. The beam portion 45 includes both end portions connected, respectively, to the opening edge of the opening portion 41.

The one end side flange 36 and the other end side flange 37 include, respectively, positioning holes 47 arranged to facilitate the positioning at the fixing. Positioning protrusions 48 formed in the upper oil pan 23 are engaged, respectively, with the positioning holes 47.

In the internal combustion engine 1 according to the above-described first embodiment, the end surfaces of the control shaft side link pin 30 are partially overlapped with the one end-side side wall 33 and the other end-side side wall 34 when viewed from the axial direction of the control shaft side link pin, irrespective of the rotation positon of the control shaft 10, that is, irrespective of the positon of the control shaft side link pin 30. Accordingly, it is possible to surely prevent the control shaft side link pin 30 from falling off along the axial direction of the control shaft side link pin, irrespective of the rotation positon of the control shaft 10.

Moreover, in the internal combustion engine 1 according to the first embodiment 1, it is possible to improve the attaching (mounting) workability of the control shaft side link pin 30, and the detaching (unmounting) workability of the control shaft side link pin 30 at the malfunction, relative to a case where a snap ring, a snap pin and so on is mounted to the control shaft side link pin 30 for preventing the failing-off.

In a case where the snap ring and so on is mounted to the control shaft side link pin 30 to prevent the control shaft side link pin 30 from falling off, the end portion of the control shaft side link pin 30 penetrating through the control shaft arm portion 22 and the lever 29 may be closer to the components around the control shaft side link pin 30 in accordance with the engine compression ratio. Accordingly, the sufficient working space cannot be ensured. Consequently, the snap ring and so on for preventing the falling-off may be difficult to be attached to and detached from the control shaft side link pin 30.

However, in the internal combustion engine 1 according to the first embodiment, the stopper 32 is fixed to the upper oil pan 23. Accordingly, it is possible to improve the assemblability, relative to a case where the snap ring and so on is attached to the control shaft side link pin 30 for preventing the falling-off. Moreover, it is possible to improve the attaching and detaching maintainability of the lever 29, the electric motor 21, and so on, irrespective of the engine compression ratio at the malfunction of the electric motor 21.

Moreover, in the case where the snap ring and so is attached to the control shaft side link pin 30 for preventing the falling-off, it is necessary that the shape for assembling the snap ring and do on is formed to the control shaft side link pin 30.

However, in the internal combustion engine 1 according to the first embodiment, the stopper 32 fixed to the upper oil pan 33 retains the control shaft side link pin 30. Accordingly, the shape of the control shaft side link pin 30 is relatively simplified. Consequently, it is possible to decrease the cost of the control shaft side link pin 30.

The one end side flange 36 and the other end side flange 37 are set on the both sides of the control shaft side link pin 30 in the axial direction of the control shaft side link pin. Accordingly, in the internal combustion engine according to the first embodiment, it is possible to improve the rigidity of the upper oil pan 23 along the axial direction of the control shaft side link pin by the stopper 32, and to decrease the vibration of the internal combustion engine main body.

Moreover, the stopper 32 is fixed to the flange 41a of the opening edge of the upper oil pan 23, and the beam portion 45 crossing the opening portion 41 of the upper oil pan 23. Accordingly, in the internal combustion engine 1 according to the first embodiment, it is possible to improve the rigidity of the opening portion 41 of the upper oil pan 23 by the stopper 32, and to decrease the vibration of the internal combustion engine main body.

The stopper 32 is fixed to the portions of the upper oil pan 32 which have the high rigidity. Accordingly, in the internal combustion engine 1 according to the first embodiment, it is possible to suppress the resonance vibration due to the mounting of the stopper 32, and thereby to decrease the vibration of the internal combustion engine main body.

The one end-side side wall 33 and the other end-side side wall 34 of the stopper 32 include portions which confront the control shaft side link pin 30 at the low engine compression ratio, and which has rigidities smaller than rigidities of portions of the one end-side side wall 33 and the other end-side side wall 34 which confront the control shaft side link pin 30 at the high compression ratio.

That is, the stopper 32 is formed so that a distance from the portion fixed to the upper oil pan 23 to the portion confronting the end surface of the control shaft side link pin 30 when viewed from the axial direction of the control shaft side link pin is set to be longer as the engine compression ratio is lower.

Figure 5:
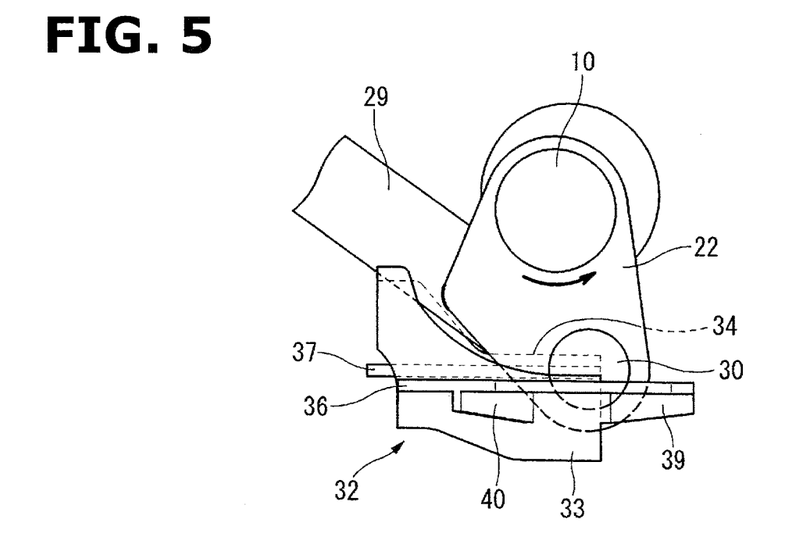
FIG. 5 is an explanation view schematically showing a position relationship between the stopper and a control shaft side link pin in a state where the control shaft is abutted on a high compression ratio side stopper.
Figure 6:
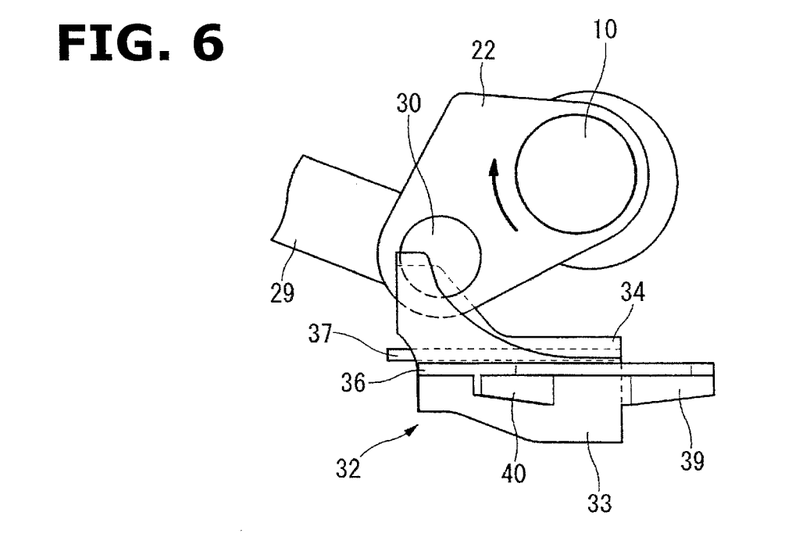
FIG. 6 is an explanation view schematically showing a position relationship between the stopper and the control shaft side link pin in a state where the control shaft is abutted on a low compression ratio side stopper.

That is, as shown in FIG. 5 and FIG. 6, the stopper 32 is formed so that a distance from the portion confronting the one end surface of the control shaft side link pin 30 in the state (FIG. 6) where the control shaft 10 is abutted on the low compression ratio side stopper (not shown), to the fixing positon at which the one end side flange 36 is fixed to the upper oil pan 23 is set to be longer than a distance from the portion confronting the one end surface of the control shaft side link pin 30 in the state (FIG. 5) where the control shaft 10 is abutted on the high compression ratio side stopper (not shown), to the fixing position at which the one end side flange 36 is fixed to the upper oil pan 23. Moreover, as shown in FIG. 5 and FIG. 6, the stopper 32 is formed so that a distance from the portion confronting the other end surface of the control shaft side link pin 30 in the state (FIG. 6) where the control shaft 10 is abutted on the low compression ratio side stopper (not shown), to the fixing positon at which the other end side flange 37 is fixed to the upper oil pan 23 is longer than a distance from the portion confronting the other end surface of the control shaft side link pin 30 in the state where the control shaft 10 is abutted on the high compression ratio side stopper (not shown), to the fixing positon at which the other end side flange 37 is fixed to the upper oil pan 23.

The engine compression ratio becomes the low compression ratio in the high rotation and high load driving state in which the vibration is relatively increased. Accordingly, in the one end-side side wall 33 and the other end-side side wall 34, the portions confronting the control shaft side link pin 30 at the low engine compression ratio are set to have the relatively low rigidity. With this, it is possible to relieve the impact (shock) at the collision of the control shaft side link pin 30 at the low engine compression ratio. With this, in the internal combustion engine 1 according to the first embodiment, it is possible to decrease the noise and the vibration at the collision of the control shaft side link pin 30 on the one end-side side wall 33 or the other end-side side wall 34, and to decrease the abrasions of the one end-side side wall 33, the other end-side side wall 34, and the control shaft side link pin 30.

The one end-side side wall 33 and the other end-side side wall 34 are formed to partially confront the end surfaces of the control shaft side link pin 30. Accordingly, in the internal combustion engine according to the first embodiment, even when the end surface of the control shaft side link pin 30 is collided due to the vibration in the state where the engine compression ratio is held to produce the recessed portion on the surface, the control shaft side link pin 30 is hard to be caught at the variation of the engine compression ratio. Accordingly, it is possible to smoothly vary the engine compression ratio.

Besides, the engine compression ratio used in the high rotation and high load driving state in which the vibration becomes relatively large is the low compression ratio. Accordingly, the one end-side side wall 33 and the other end-side side wall 34 are formed so that the overlapping areas with the end surfaces of the control shaft side link pin 30 become larger as the engine compression ratio becomes lower. With this, it is possible to decrease the surface pressure when the control shaft side link pin 30 is collided on the one end-side side wall 33 and the other end-side side wall 34 due to the vibration.

Other embodiments according to the present invention are explained. Besides, constituting elements identical to those of the above-described first embodiment have the same symbols. The repetitive explanations are omitted.

Figure 7:
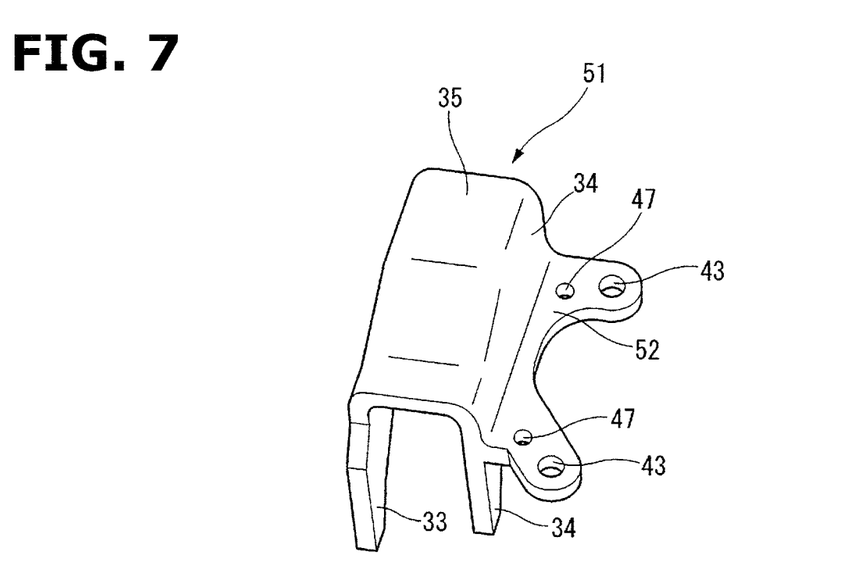
FIG. 7 is a perspective view showing a stopper in a second embodiment.
Figure 8:
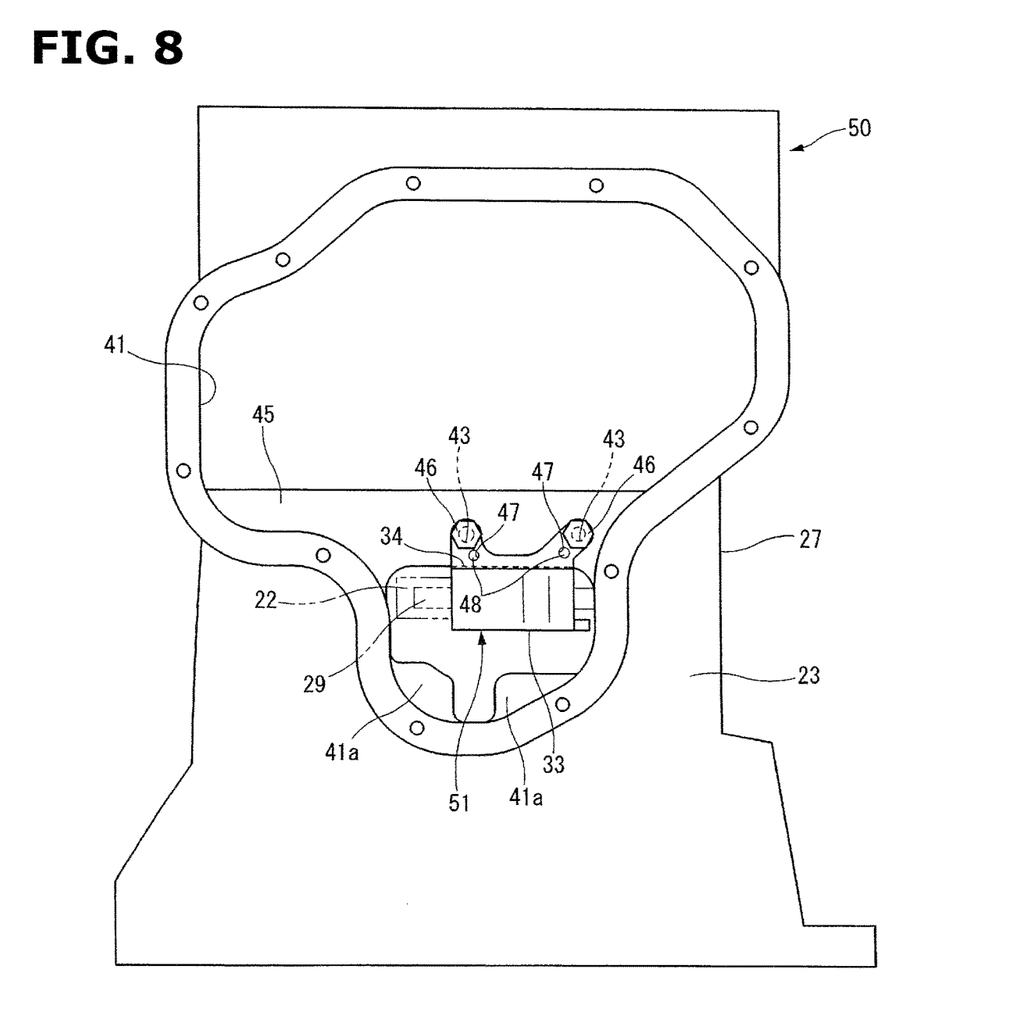
FIG. 8 is an explanation view schematically showing a mounting state in which the stopper is mounted to the upper oil pan in the second embodiment.

A second embodiment according to the present invention is explained with reference to FIG. 7 and FIG. 8. An internal combustion engine 50 according to the second embodiment has a structure substantially identical to the internal combustion engine 1 according to the first embodiment. However, the stopper 51 does not include the one end side flange. That is, the stopper 51 is fixed to the upper oil pan 23 only by the other end side flange 52 protruding from the other end-side side wall 34.

In the second embodiment, the other end side flange 52 includes two of the other end side bolt through holes 43 and 43. The other end side bolt through holes 43 and 43 are positioned on the tip end side of the other end side flange 52. The other end side bolt through holes 43 and 43 are formed to be apart from each other in the longitudinal direction of the stopper 51. The other end side flange 52 is fixed at the portion of the beam portion 45 which has a relatively high rigidity, from the lower surface side of the upper oil pan 23 by two bolts 46 and 46 along the radial direction of the control shaft. The beam 45 crosses the opening portion 41 of the upper oil pan 23 in the widthwise direction (the leftward and rightward directions in FIG. 8) of the internal combustion engine main body.

In the internal combustion engine 50 according to the second embodiment, the stopper 51 does not include the one end side flange. Accordingly, the internal combustion engine 50 does not attain the improvement of the rigidity of the upper oil pan 23 along the axial direction of the control shaft side link pin by the stopper 51, and the improvement of the rigidity of the opening portion 41 of the upper oil pan 23 by the stopper 51. However, it is possible to attain the other operations and the other effects which are identical to those of the internal combustion engine 1 according to the first embodiment.

Figure 9:
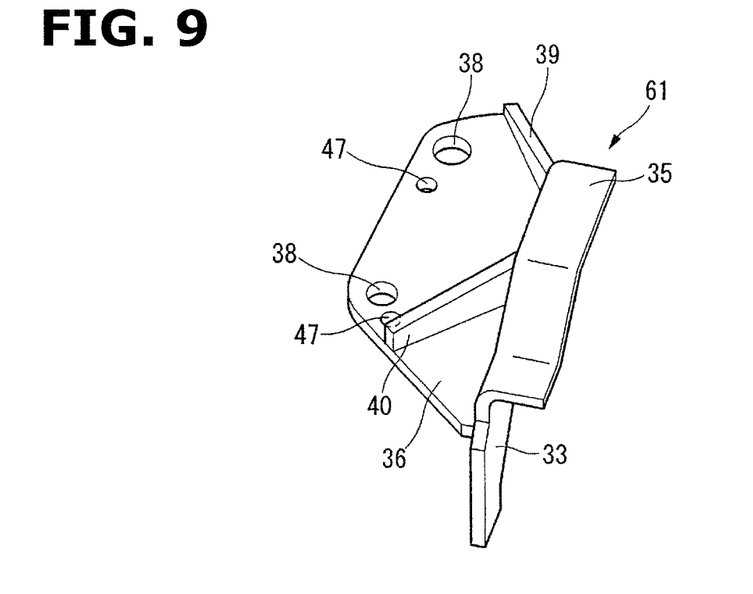
FIG. 9 is a perspective view showing a stopper in a third embodiment.
Figure 10:
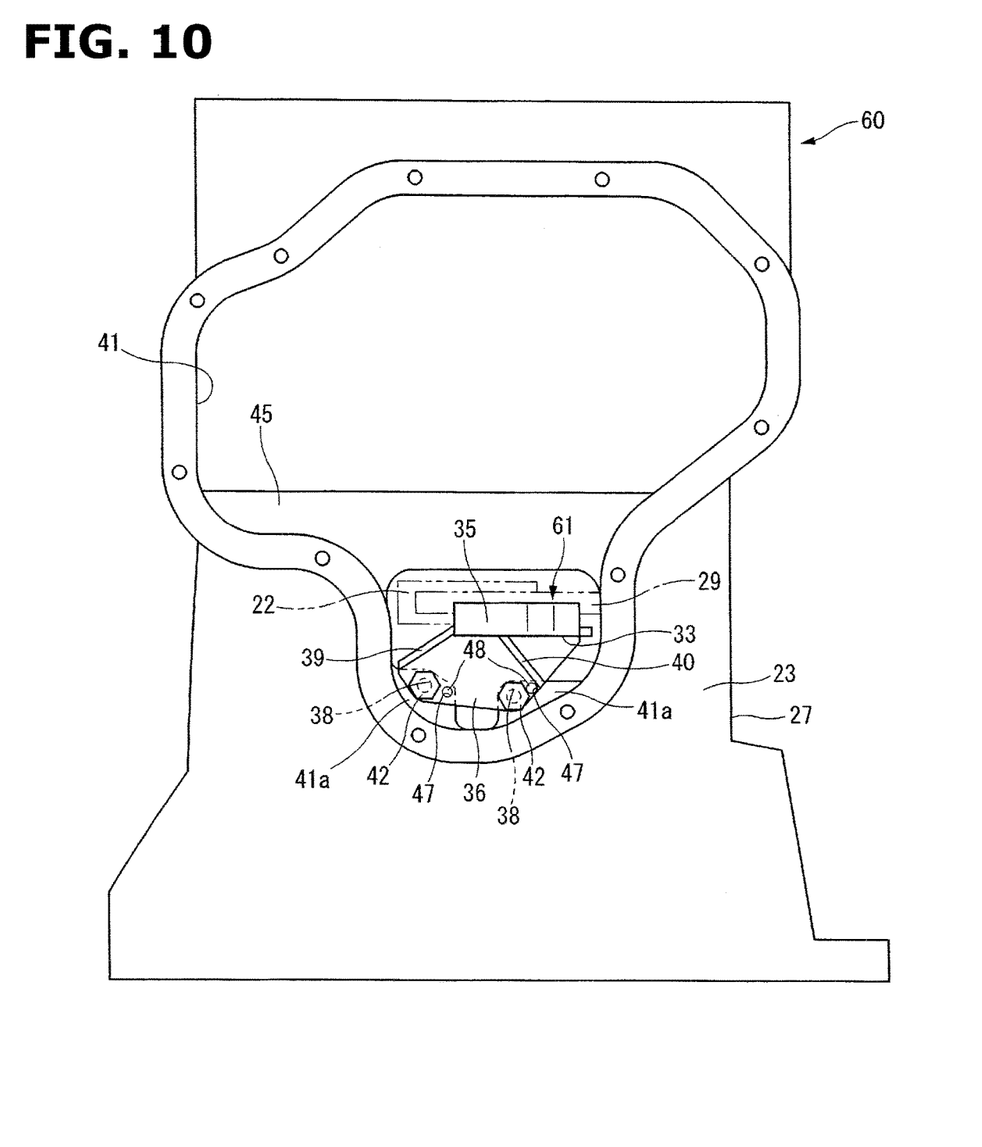
FIG. 10 is an explanation view schematically showing a mounting state in which the stopper is mounted to the upper oil pan in the third embodiment.

A third embodiment according to the present invention is explained with reference to FIG. 9 and FIG. 10. An internal combustion engine 60 according to the third embodiment has a structure substantially identical to that of the internal combustion engine 1 according to the first embodiment. However, the stopper 61 does not include the other end-side side wall and the other end side flange.

That is, in the third embodiment, the stopper 61 has a shape identical to a shape of one of two sections formed by dividing the stopper 32 according to the first embodiment at a central of a bottom wall 35 along the longitudinal direction. The stopper 61 includes one end-side side wall 33 which is a wall portion confronting the one end surface of the control shaft side link pin 30; the bottom wall 35 protruding inwardly from a base end of the one end-side side wall 33; and one end side flange 36 which has a plate shape, which protrudes outwardly from the one end-side side wall 33, and which is fixed to the upper oil pan 23.

The stopper 61 is fixed to the upper oil pan 23 only by the one end side flange 36 protruding from the one end-side side wall 33.

The one end-side side wall 33 of the stopper 61 prevents the control shaft side link pin 30 from falling off on the one side of the axial direction of the control shaft side link pin, irrespective of the rotation position of the control shaft 10. The snap ring (not shown) mounted to the control shaft side link pin 30 prevents the control shaft side link pin 30 from falling off on the other side of the axial direction of the control shaft side link pin.

In the internal combustion engine 60 according to the third embodiment, the stopper 61 does not include the other end side flange. Accordingly, the internal combustion engine 60 does not attain the improvement of the upper oil pan 23 along the axial direction of the control shaft side link pin by the stopper 61, and the improvement of the rigidity of the opening portion 41 of the upper oil pan 23 by the stopper 61. However, it is possible to attain the other operations and effects which are substantially identical to those of the internal combustion engine 1 according to the first embodiment.

Besides, in the internal combustion engine 60 according to this third embodiment, the stopper 61 includes only the one end-side side wall 33 only for preventing the control shaft side link pin 30 from falling off on the one side of the axial direction of the control shaft side link pin. Accordingly, it is possible to relatively decrease the size and the weight of the stopper 61.

Moreover, in the above-described embodiments, the one end of the lever is sandwiched between the tip ends of the control shaft arm portion which have the bifurcated shape. However, the one end of the lever may be the bifurcated shape. The tip end of the arm portion may be sandwiched. Moreover, the wall portion may be any shapes as long as the wall portion confronts the end surface of the link pin so as to prevent the connection pin from falling off.

The invention claimed is:

1. An internal combustion engine comprising:
a variable compression ratio mechanism arranged to vary an engine compression ratio in accordance with a rotation position of a control shaft;
an actuator arranged to vary the rotation position of the control shaft;
an arm portion extending from the control shaft in a radially outward direction;
a lever arranged to link the actuator and the arm portion;
a link pin which penetrates the lever and the arm portion, and which rotatably links the lever and the arm portion; and
a wall portion which confronts an end surface of the link pin irrespective of the rotation position of the control shaft, and which retains the link pin to the lever or the arm portion,
wherein mounting positions of a stopper including the wall portion to an internal combustion engine main body are set on both sides of the link pin in an axial direction of the link pin,
wherein the stopper includes
a first end side portion which is a wall portion confronting a first end surface of the link pin;
a second end side portion which is a wall portion that is parallel to the first end side portion, and confronts a second end surface of the link pin;
a bottom wall connecting the first end side portion and the second end side portion;
a first end side flange having a plate shape, which protrudes from the first end side portion, and is fixed to a portion of an upper oil pan that has a relatively high rigidity; and
a second end side flange having a plate shape, which protrudes from the second end side portion, and is fixed to a portion of the upper oil pan, and
wherein the first end side flange and the second end side flange are set on the both sides of the link pin in the axial direction of the link pin.

2. An internal combustion engine comprising:
a variable compression ratio mechanism arranged to vary an engine compression ratio in accordance with a rotation position of a control shaft;
an actuator arranged to vary the rotation position of the control shaft;
an arm portion extending from the control shaft in a radially outward direction;
a lever arranged to link the actuator and the arm portion;
a link pin which penetrates the lever and the arm portion, and which rotatably links the lever and the arm portion; and
a wall portion which confronts an end surface of the link pin irrespective of the rotation position of the control shaft, and which retains the link pin to the lever or the arm portion,
wherein mounting positions of a stopper including the wall portion to an internal combustion engine main body are set on both sides of the link pin in an axial direction of the link pin, and
wherein the wall portion includes a portion which confronts the link pin at a low engine compression ratio, and which has a rigidity set to be lower than a rigidity of a portion of the wall portion confronting the link pin at a high engine compression ratio.

3. An internal combustion engine comprising:
a variable compression ratio mechanism arranged to vary an engine compression ratio in accordance with a rotation position of a control shaft;
an actuator arranged to vary the rotation position of the control shaft;
an arm portion extending from the control shaft in a radially outward direction;
a lever arranged to link the actuator and the arm portion;
a link pin which penetrates the lever and the arm portion, and which rotatably links the lever and the arm portion; and
a wall portion which confronts an end surface of the link pin irrespective of the rotation position of the control shaft, and which retains the link pin to the lever or the arm portion,
wherein mounting positions of a stopper including the wall portion to an internal combustion engine main body are set on both sides of the link pin in an axial direction of the link pin, and
wherein the wall portion is formed so that a distance from a fixing position at which a bottom wall is fixed to an internal combustion engine main body to a portion confronting the end surface of the link pin is longer as the engine compression ratio becomes lower, when viewed in an axial direction of the link pin.

4. An internal combustion engine comprising:
a variable compression ratio mechanism arranged to vary an engine compression ratio in accordance with a rotation position of a control shaft;
an actuator arranged to vary the rotation position of the control shaft;
an arm portion extending from the control shaft in a radially outward direction;
a lever arranged to link the actuator and the arm portion;
a link pin which penetrates the lever and the arm portion, and which rotatably links the lever and the arm portion; and
a wall portion which confronts an end surface of the link pin irrespective of the rotation position of the control shaft, and which retains the link pin to the lever or the arm portion,
wherein mounting positions of a stopper including the wall portion to an internal combustion engine main body are set on both sides of the link pin in an axial direction of the link pin, and
wherein an internal combustion engine main body includes an upper oil pan fixed to a lower portion of a cylinder block; and mounting positions of the stopper including the wall portion to the internal combustion engine main body are a beam portion which crosses an oil pan opening portion formed in the upper oil pan in a widthwise direction of the internal combustion engine main body to divide the oil pan opening portion, and an opening edge of the oil pan opening portion.

* * * * *